Feb. 16, 1926.
H. FAY
GREASE GUN
Filed June 25, 1925
1,573,150
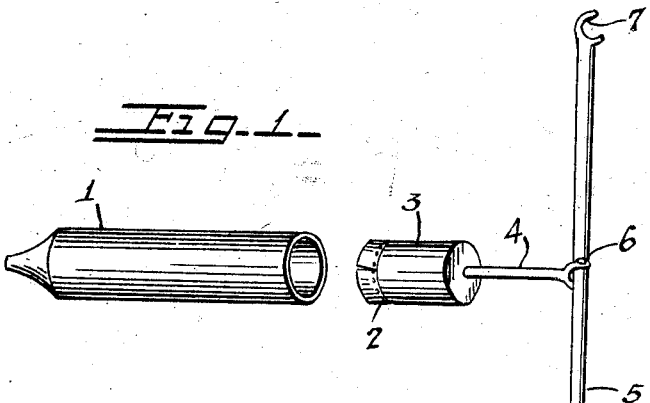
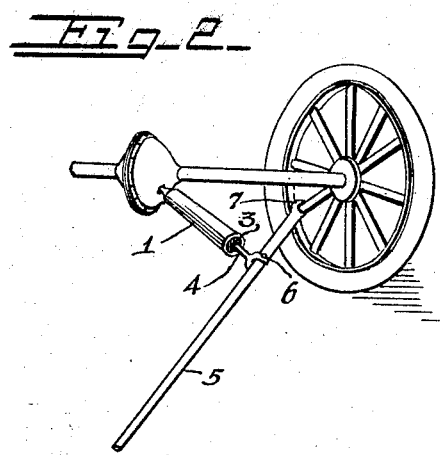
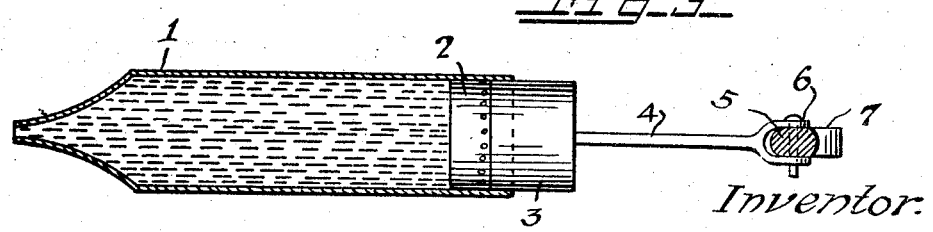
Inventor:
Harry Fay Patented Feb. 16, 1926.

1,573,150

UNITED STATES PATENT OFFICE.

HARRY FAY, OF MILLERSBURG, KENTUCKY.

GREASE GUN.

Application filed June 25, 1925. Serial No. 39,410.

*To all whom it may concern:*

Be it known that I, HARRY FAY, a citizen of the United States of America, residing at Millersburg, in the county of Bourbon and State of Kentucky, have invented a new and useful Grease Gun, of which the following is a specification.

In the drawings,

Fig. 1 is a view of the parts of the device disassembled.

Fig. 2 shows the application of the device to use in filling the differential casing and Fig. 3 is view partly in section showing the piston assembled in a filled gun.

The gun 1 has a tapered spout to fit the filling opening in a differential casing and is open at the other end to receive a piston 3 having a band washer 2 of leather the washer adapted to expand against the cylinder walls and make a tight fit.

The piston rod 4 is provided with a long actuating lever 5 pivoted to said rod 4 at 6 and provided with a claw 7 adapted to catch in the spoke of a wheel and thus form a fulcrum for the lever when pressing the grease from the gun.

What I claim is:—

An open ended grease container having one end formed for insertion into a receptacle to be filled and the other end to receive a piston to expel the grease in the gun, the piston being readily removable from and insertable in the grease container, a rod connected to the piston, and a long handled lever pivoted to the rod and having a claw on its end to form with some fixed support a fulcrum for the lever.

HARRY FAY.